United States Patent
Kirsch et al.

(10) Patent No.: US 9,203,324 B2
(45) Date of Patent: Dec. 1, 2015

(54) METHOD FOR OPERATING AN INVERTER, AND CONTROL DEVICE

(71) Applicant: SMA Solar Technology AG, Niestetal (DE)

(72) Inventors: Oliver Kirsch, Ruesselsheim (DE); Lars Bethke, Goettingen (DE); Bernhard Sofaly, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 188 days.

(21) Appl. No.: 13/934,427

(22) Filed: Jul. 3, 2013

(65) Prior Publication Data

US 2013/0301315 A1    Nov. 14, 2013

Related U.S. Application Data

(63) Continuation of application No. PCT/EP2011/074006, filed on Dec. 23, 2011.

(30) Foreign Application Priority Data

Jan. 3, 2011 (DE) .......... 10 2011 007 929

(51) Int. Cl.
- *H02M 3/335* (2006.01)
- *H02M 5/458* (2006.01)

(Continued)

(52) U.S. Cl.
CPC ............ *H02M 5/458* (2013.01); *H02M 1/32* (2013.01); *H02M 7/53871* (2013.01); *H02M 2001/007* (2013.01)

(58) Field of Classification Search
CPC ............ H02M 2001/4291; H02M 7/53875; H02P 9/48
USPC ........ 363/16, 17, 21.08, 21.12, 21.13, 21, 18, 363/39, 41, 44, 53, 80, 89, 97, 126; 323/271, 272, 282–285
See application file for complete search history.

(56) References Cited

U.S. PATENT DOCUMENTS

| | | | |
|---|---|---|---|
| 6,603,672 B1 * | 8/2003 | Deng et al. | 363/37 |
| 6,950,323 B2 * | 9/2005 | Achleitner et al. | 363/55 |

(Continued)

FOREIGN PATENT DOCUMENTS

| | | | |
|---|---|---|---|
| CN | 101795080 | * | 8/2010 |
| CN | 101795080 A | | 8/2010 |

(Continued)

OTHER PUBLICATIONS

International Preliminary Report on Patentability for PCT/EP2011/074006 dated Jul. 20, 2013.

(Continued)

*Primary Examiner* — Rajnikant Patel
(74) *Attorney, Agent, or Firm* — Eschweiler & Associates, LLC

(57) ABSTRACT

A method for limiting an output power of an inverter having an output bridge and an upstream boost converter includes determining a first measurement variable representative of a bridge temperature and a second measurement variable representative of an output power of the inverter. The method also includes determining a third measurement variable representative of a generator voltage at generator connections of the inverter or a fourth measurement variable representative of an output voltage at a power output of the inverter, and reducing the output power supplied to a power supply grid to a reduced power value. The reduced power value is determined based on the first measurement variable, the second measurement variable and at least one of the third and fourth measurement variables. A control device having such functionality is also disclosed.

11 Claims, 2 Drawing Sheets

(51) Int. Cl.
  *H02M 1/32* (2007.01)
  *H02M 7/5387* (2007.01)
  *H02M 1/00* (2007.01)

(56) References Cited

U.S. PATENT DOCUMENTS

| | | | |
|---|---|---|---|
| 7,221,121 B2 * | 5/2007 | Skaug et al. | 318/807 |
| 7,456,523 B2 * | 11/2008 | Kobayashi | 307/82 |
| 7,796,412 B2 * | 9/2010 | Fornage | 363/97 |
| 8,138,711 B2 * | 3/2012 | Hwang et al. | 318/807 |
| 8,625,243 B2 * | 1/2014 | Rozman et al. | 361/90 |
| 2008/0055941 A1 | 3/2008 | Victor et al. | |

FOREIGN PATENT DOCUMENTS

| | | | |
|---|---|---|---|
| DE | 102007050228 | * | 4/2009 |
| DE | 102007050228 A1 | | 4/2009 |
| EP | 2051019 A2 | | 4/2009 |
| JP | 2001169401 A | | 6/2001 |
| WO | 03044939 A1 | | 5/2003 |

OTHER PUBLICATIONS

International Search Report for PCT/EP2011/074006 dated Aug. 31, 2012, p. 1-17.

* cited by examiner

METHOD FOR OPERATING AN INVERTER, AND CONTROL DEVICE

CROSS REFERENCE TO RELATED APPLICATIONS

This application is a Continuation of International Patent Application No. PCT/EP2011/074006 filed Dec. 23, 2011 which claims priority to German Patent Application No. 102011007929.7 filed Jan. 3, 2011, entitled "Method for Operating An Inverter, and Control Device," and is hereby incorporated by reference.

FIELD

The disclosure relates to a method for operating an inverter, in particular as part of an power generation system, and to a control device, in particular as part of an inverter, for carrying out the method.

BACKGROUND

Inverters are used to convert the power generated by a generator, for example by a photovoltaic generator, as a DC voltage into an AC voltage power compliant with a power supply grid. In this case, the losses inside the inverter result in heating of the inverter, in particular heating of the power semiconductors as switching elements, which may be damaged as a result of excessive heating. It is therefore necessary to monitor the temperature of these switching elements and to reduce the converter power of the inverter, if necessary, if a limit value of the switch temperature is exceeded. For this purpose, the modules inside the inverter which contain the power semiconductors have monitoring elements for the temperature, for example thermodiodes or NTC (Negative Temperature Coefficient) resistors. A load limiter as part of the inverter monitors the temperature measured in this manner and initiates a reduction in the converter power if the temperature of the monitored switches is expected to be exceeded upon continuation of inverter operation with the instantaneous converter power. Accordingly, it can be ensured that the modules are protected from excessive heating, in particular from heating, that would shorten the service life or destroy switching elements.

The disadvantage of the known prior art is that switching elements with no associated monitoring elements for the temperature cannot be monitored in the above-described manner. Instead, it is necessary to use thermal modeling of the inverter to calculate the temperature of the latter indirectly via the recorded measurement variables, for example the temperature of the switches of an output bridge of the inverter, and the instantaneous converter power and to convert it into limit values requiring a reduction of the converter power. Such indirectly monitored switching elements may be, for example, part of a boost converter converting the DC voltage provided by the connected generator into a higher value of a voltage across an intermediate circuit of the inverter. This results in the situation in which the inverter is limited, that is to say the instantaneous converter power is reduced to a value equal to or below a calculated limit value even though no critical temperatures would yet be reached if operation of the inverter were continued with a converter power which has not been reduced. The cause of this is that it is not possible to reliably infer the temperature of the switching elements of the boost converter from the measurement variables of the instantaneous converter power and the bridge temperature because measurement variables that significantly influence the load on the switching elements of the boost converter are not taken into account. In this situation, often so-called worst-case scenarios are used, in which values which correspond to the most unfavorable operating state are assumed for measurement variables that have not been determined. Consequently, the converter power is therefore reduced too early in this case if the actual operating state does not correspond to this most unfavorable operating state.

This disadvantageous effect occurs, in particular, when the switches that are thermally directly monitored using temperature sensors and the indirectly monitored switches are arranged at a great distance from one another in the inverter and therefore have an unreliable temperature correlation. The safety margins for the worst-case scenarios are then particularly large and the inverter is often unnecessarily limited. This situation is pronounced in high-frequency converters, for example, since the DC isolation between the boost converter as the input stage and the output bridge as the output stage regularly also entails spatial separation. An additional outlay in terms of design likewise results when electrical signals from DC-isolated regions are needed to monitor a switch.

Even if the modules with the power semiconductors have temperature sensors, the measurement variable determined in this manner provides only an inaccurate measure of the load on the individual switch, in particular if the loads on the individual switches of a module are different, and there is dependence on a sufficiently large safety margin when determining the load threshold for limiting the inverter according to the known methods in accordance with the prior art.

SUMMARY

The present disclosure provides a method that can be used to operate an inverter in a reliable manner for as long as possible with an undiminished converter power, in particular with a maximum possible converter power, without the switching elements of the inverter being thermally excessively loaded. The disclosure also provides a control device for an inverter ensuring such operation without the switching elements being overloaded.

The method according to the disclosure comprises the steps of determining a first measurement variable that is representative of an instantaneous bridge temperature, for example, the temperature of a temperature sensor integrated in a module of the output bridge, and a second measurement variable that is representative of an instantaneous converter power of the inverter. These two measurement variables can be used, in principle, to determine a limit value for a converter power, wherein the limit value precludes overloading of the output bridge. The method also comprises determining an additional third measurement variable that is representative of an instantaneous generator voltage at generator connections or, alternatively or in combination, determining a fourth measurement variable that is representative of an instantaneous output voltage at a power output of the inverter. The third and fourth measurement variables make it possible to determine the degree of loading on a boost converter of the inverter in a substantially more reliable manner than would be possible using the first and second measurement variables alone. In particular, the third and fourth measurement variables determine the degree by which the boost converter must increase an input voltage at generator connections to a voltage of an intermediate circuit at the output of the boost converter. In one embodiment at least one of these third and fourth measurement variables is used, in combination with the first and second measurement variables, to predefine a reduced power value to which the converter power is reduced by limiting the inverter.

Boost converters comprising two switches operated in a parallel manner are used in current inverter topologies. A so-called MOSFET (Metal Oxide Semiconductor Field Effect Transistor) is often used together with an IGBT (Insulated Gate Bipolar Transistor) in this case. On account of its changeover phases, which are shorter than in the IGBT, the MOSFET has lower switching losses, while the IGBT has an internal resistance lower than the MOSFET. Therefore, it has been found to be advantageous to operate the boost converter only by switching the MOSFET in the case of a low load on the converter, while operation of both switches in a parallel manner is advantageous in the case of a high load on the boost converter. Accordingly, in one embodiment of the method, the first measurement variable, the second measurement variable and at least one of the third and fourth measurement variables are used as a basis to determine whether the boost converter is operated in a first operating mode by simultaneously clocking the first and second switches or in a second operating mode by only clocking the first switch. This makes it possible to minimize the switching losses of the boost converter with a sufficiently low converter power and to also make optimum use of the power reserves of the parallel circuit comprising the two switches of the boost converter. In order to ensure stable operation of the inverter without unnecessarily frequent changing over between the operating modes, the changeover between the operating modes can be effected using a hysteresis characteristic. The changeover from the second operating mode (only one clocked switch) to the first operating mode (parallel clocked switches) is effected at a first threshold value for the generator current or for the converter power or comparable variables for the load on the boost converter, but the return to the second operating mode is effected at a second threshold value lower than the first threshold value.

In one embodiment, both the determination of a reduced converter power and the choice between the first operating mode and the second operating mode can alternatively be carried out by predefining a maximum current value, in particular a maximum generator current value. This predefinition can be made by means of calculation from the respective measurement variables or else by looking up a table of reference values with optionally possible interpolation between adjacent reference values. These reference values can be determined in advance by means of experiments on a real inverter or may be results of thermal modeling, for example, by simulating the heat transport inside the inverter, or by combining these two determination methods.

In one embodiment, the overall efficiency of the boost converter can be optimized further by virtue of the switch-off process of the two switches being carried out with a time delay, rather than fully synchronously, during parallel operation of both switches of the boost converter; in particular, the IGBT can be switched off at an earlier time than the MOSFET. Alternatively or in combination, the IGBT may likewise be switched on later than the MOSFET. This makes it possible to further reduce the switching losses because the longer changeover phases of the IGBT partially overlap the periods of time in which the MOSFET is on resulting in only a small voltage across the IGBT.

An optional additional step for optimizing the efficiency of the boost converter is to vary the clock frequency of the switch(es) of the boost converter. It is thus conceivable to operate the boost converter at a reduced clock frequency of, for example, 16 kHz in the case of a low converter power, for example, whereas a changeover to a clock frequency of, for example, 48 kHz is made in the case of a higher converter power. In this case, the changeover between the clock frequencies can also be carried out in combination with changing that switch of the two parallel switches that is currently being clocked.

Advantageous developments of the disclosure emerge from the patent claims, the description and the drawings. The advantages of features and combinations of a plurality of features, as mentioned in the description, are only examples and may alternatively or cumulatively come into effect without necessarily having to achieve the advantages of embodiments according to the disclosure. Further features can be gathered from the drawings. However, notwithstanding the selected dependency references of the patent claims, it is likewise possible to combine features of different embodiments of the disclosure or features of different patent claims and this is hereby suggested. This also relates to those features which are illustrated in separate drawings or are mentioned in the description of the latter. These features can also be combined with features of different patent claims.

BRIEF DESCRIPTION OF THE DRAWINGS

The disclosure is explained and described in more detail below using example embodiments with reference to the accompanying drawings, in which.

DETAILED DESCRIPTION

Figure 1:
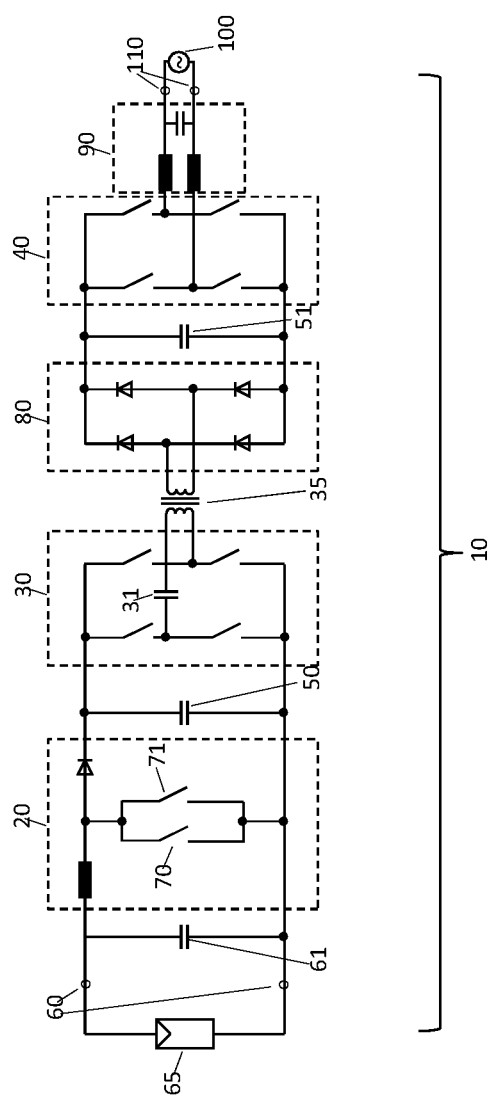
FIG. 1 shows a schematic illustration of an inverter.

FIG. 1 shows a structure of an inverter 10 that converts the DC voltage power of a generator 65 provided at generator connections 60 into an AC voltage compliant with the power supply grid and supplies the voltage to a power supply grid 100 via a power output 110. For this purpose, the generator voltage at an input capacitance 61 is first of all boosted to a first intermediate circuit voltage of a first intermediate circuit 50 by means of a boost converter 20. From there, the intermediate circuit voltage is converted, via an HF bridge 30, into a high-frequency AC voltage that is applied to a primary winding of an HF transformer 35. A secondary winding of the HF transformer 35 is connected to a rectifier 80 that converts the transformed high-frequency AC voltage into a DC voltage again and applies it to a second intermediate circuit 51. From there, the DC voltage is supplied, as an AC voltage compliant with the power supply grid, to a connected power supply grid 100 via a power output 110 with the aid of an output bridge 40 followed by an output filter 90 on the output side.

The boost converter 20 comprises a first switch 70 arranged parallel to a second switch 71. Accordingly, a current is divided between the first and second switches if both switches are clocked together, such that each individual switch of the switches 70, 71 is subjected to a lower load and the boost converter overall can be accordingly subjected to a higher load. In one embodiment, the two switches are of different types; in particular, the first switch 70 can be a MOSFET and the second switch 71 can be an IGBT in this example.

The HF bridge 30 is an H-bridge in the embodiment of FIG. 1 but may also be a half-bridge. In this example, the intermediate circuit 50 is a split intermediate circuit with two intermediate circuit capacitors. In order to reduce the switching load on the switches of the HF bridge 30, it is recommended to configure coupling between the HF bridge 30 and the rectifier 80 as resonant coupling, wherein a resonant capacitance 31, together with a leakage inductance (not shown) of a winding of the HF transformer 35, determines a resonant frequency. The resonant capacitance 31 and the leakage inductance can be arranged either on the primary side or the secondary side with respect to the HF transformer 35 in this case.

The output bridge 40 is also shown as an H-bridge in FIG. 1, however, a multiplicity of further topologies are likewise suitable for converting the DC voltage of the second intermediate circuit 51 into an AC voltage for supply to the power supply grid 100. A three-phase or multi-phase power supply grid can also be used instead of an output bridge 40 for single-phase supply.

At this point, it is also noted that, for the other functional areas of the boost converter 20, rectifier 80 and output filter 90, as illustrated in FIG. 1, the circuits shown are given only example importance and other embodiments familiar to a person skilled in the art can be used.

Figure 2:
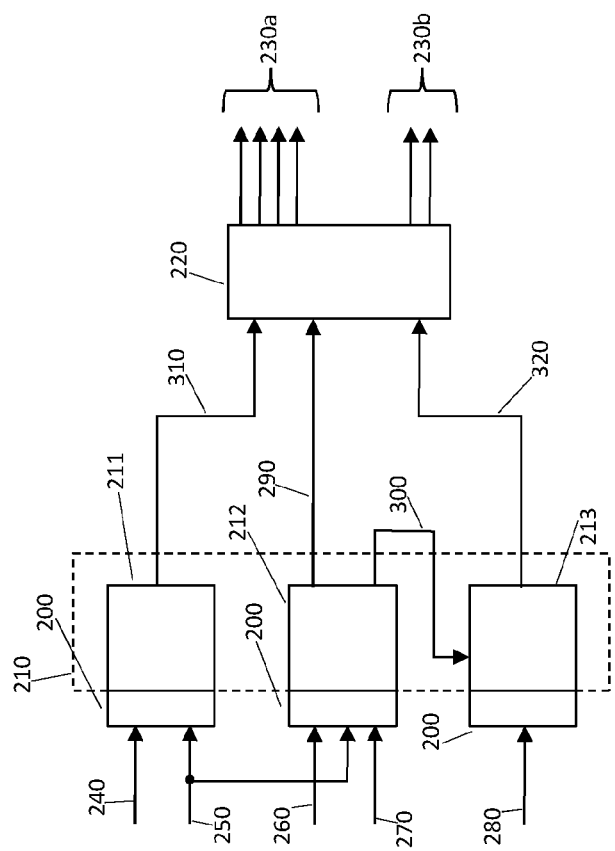
FIG. 2 illustrates a structure for a control device according to the disclosure.

FIG. 2 shows a control device for driving the inverter 10. The control device comprises a load limiter 210 which, in this example, is divided into a plurality of modules 211, 212, 213. Each module 211, 212, 213 is assigned to its own detection unit 200 used to determine and quantify the measurement variables of the inverter 10 for further processing and to transmit them to the corresponding load limiter module. A first measurement variable that contains information relating to the temperature of the output bridge 40 or is representative thereof is supplied to the detection unit 200 of the first module 211 via a first signal line 250. A second measurement variable containing information relating to the instantaneous converter power is likewise passed to the detection unit 200 of the first module 211 via a second signal line 240. The first module 211 of the load limiter 210 uses the variables to generate a first limit value transmitted to a drive circuit 220 via a signal line 310. In this case, the first limit value can correspond to a limit value of the converter power, wherein limiting is carried out when the limit value is exceeded.

A third measurement variable containing information relating to the instantaneous generator voltage at generator connections 60 and a fourth measurement variable containing information relating to the instantaneous output voltage at the power output 110 are determined and quantified via the detection unit 200 assigned to a second module 212 using a third signal line 260 and a fourth signal line 270. The second module 212 uses the variables to determine a second limit value transmitted to the drive circuit 220 via a signal line 290. The first measurement variable is likewise transmitted to the detection unit 200 assigned to the second module 212 via a branch of the first signal line 250 and is taken into account when determining the second limit value at signal line 290. The second limit value may correspond, for example, to a limit value for the generator current, wherein the converter power is reduced when the limit value is exceeded.

A third limit value is also transferred, via a signal line 300, to the third module 213 configured as a selection module for an operating mode of the boost converter 20. In this case, the third limit value predefines a threshold value to which a fifth measurement variable is compared, the variable being transmitted to the detection unit 200 assigned to the third module 213 via a fifth signal line 280. For example, the fifth measurement variable corresponds to an instantaneous generator current and the changeover between the operating modes is carried out when the generator current exceeds the limit defined by the threshold value. The exceeding can take place in both directions and accordingly results in a change from the first operating mode to the second operating mode or vice versa. The drive circuit 220 is informed of the operating mode to be used by a signal via the signal line 320. The third module 213 and the function of selecting the operating mode are optional in one embodiment.

The drive circuit 220 generates switching signals on the control lines 230a, which are used to drive the switches of the output bridge 40 in such a manner that the corresponding limit values are complied with during inverter operation. If necessary, the converter power is reduced in order to comply with the limit values. Switching signals are likewise transmitted to the switches 70, 71 of the boost converter 20 on the control lines 230b, which switching signals, on the one hand, correspond to the operating mode determined by the selection module 213 and, on the other hand, likewise ensure that the limit values are complied with, as described above. It goes without saying that the drive circuit 220 may generate further switching signals for further switches of the inverter 10, taking into account the limit values, for example for the switches of the HF bridge 30 if present.

As a result of the modular structure of the load limiter 210, it is possible to implement independent monitoring of a thermal overload situation for the individual functional areas of the inverter, such as for the boost converter 20 and the output bridge 40. In this respect, it is conceivable for the determined measurement variables to be assigned to the modules in a different manner or else to be used jointly by a plurality of modules in order to further increase the monitoring reliability or to initiate a reduction in the converter power only when the maximum degree of loading on a functional area, in particular the maximum temperature of a switch, has been reached.

In a generalization of the control device, the control device may be constructed in a non-modular manner and may have only one detection unit 200 used to determine and quantify all measurement variables, and one load limiter 210 to which the detection unit 200 is connected for the purpose of transmitting the measurement variables. Accordingly, the output power of the inverter 10 is limited in this case by the load limiter 210 in conjunction with the drive circuit.

The invention claimed is:

1. A method for limiting an output power of an inverter comprising an output bridge and an upstream boost converter, the method comprising:
   determining a first measurement variable representative of a bridge temperature and a second measurement variable representative of an output power of the inverter;
   determining a third measurement variable representative of a generator voltage at generator connections of the inverter or a fourth measurement variable representative of an output voltage at a power output of the inverter; and
   reducing the output power supplied to a power supply grid to a reduced power value, wherein reducing the output power comprises reducing the output power while concurrently maintaining an output frequency of the inverter supplied to the power supply grid generally constant,
   wherein the reduced power value is determined based on the first measurement variable, the second measurement variable and at least one of the third and fourth measurement variables.

2. The method as claimed in claim 1, wherein the first and second measurement variables and at least one of the third and fourth measurement variables are used to determine whether the boost converter is operated in a first operating mode defined by simultaneously clocking a first switch and a second switch arranged in parallel to the first switch or in a second operating mode defined by only clocking the first switch.

3. The method as claimed in claim 1, wherein the reduced power value is determined by predefining a maximum generator current value.

4. The method as claimed in claim 2, wherein the clocking is carried out in the first operating mode in such a manner that the first switch is switched off after the second switch.

5. The method as claimed in claim 2, wherein the first switch is a MOSFET and the second switch is an IGBT.

6. A control device for an inverter, comprising:
a detection unit configured to determine a first measurement variable representative of a bridge temperature and a second measurement variable representative of an output power of the inverter;
a load limiter configured to determine limit values for limiting the output power of the inverter, wherein the load limiter is connected to the detection unit and configured to receive the first and second measurement variables from the detection unit; and
a drive circuit connected to the load limiter and configured to receive at least one limit value and configured to drive switches of the inverter such that the at least one limit value is complied with during operation of the inverter while concurrently maintaining an output frequency of the inverter supplied to a power supply grid generally constant,
wherein the load limiter is further configured to receive at least one third measurement variable representative of a generator voltage at generator connections of the inverter or a fourth measurement variable representative of an output voltage at a power output of the inverter, and still further configured to determine the at least one limit value based on the first measurement variable, the second measurement variable and at least one of the third and fourth measurement variables.

7. The control device as claimed in claim 6, wherein the load limiter is connected to a boost converter of the inverter in such a manner that the first and second measurement variables and at least one of the third and fourth measurement variables are used to determine whether the boost converter is operated in a first operating mode defined by simultaneous clocking of a first switch and a second switch parallel to the first switch or in a second operating mode defined by only clocking the first switch.

8. The control device as claimed in claim 7, wherein the first switch is a MOSFET and the second switch is an IGBT.

9. An inverter, comprising:
a boost converter configured to receive an input DC voltage and output a boosted DC voltage, wherein the boost converter is configured to operate in two different operating modes;
an output bridge circuit configured to receive a voltage related to the boosted DC voltage and output an AC voltage for a grid; and
a control device, comprising:
a detection unit configured to determine a first measurement variable representative of a bridge temperature and a second measurement variable representative of an output power of the inverter;
a load limiter configured to determine limit values for limiting the output power of the inverter, wherein the load limiter is connected to the detection unit and configured to receive the first and second measurement variables from the detection unit; and
a drive circuit connected to the load limiter and configured to receive at least one limit value and configured to drive switches of the inverter such that the at least one limit value is complied with during operation of the inverter while concurrently maintaining an output frequency of the inverter supplied to the grid generally constant,
wherein the load limiter is further configured to receive at least one third measurement variable representative of a generator voltage at generator connections of the inverter or a fourth measurement variable representative of an output voltage at a power output of the inverter, and still further configured to determine the at least one limit value based on the first measurement variable, the second measurement variable and at least one of the third and fourth measurement variables.

10. The inverter as claimed in claim 9, wherein the inverter is configured as a high-frequency converter.

11. The inverter as claimed in claim 9, wherein the boost converter comprises first and second switches coupled together in parallel, and wherein the boost converter is operated in a first operating mode defined by simultaneously clocking the first switch and the second switch or in a second operating mode defined by only clocking the first switch.

* * * * *